May 29, 1928.
C. E. C. EDEY
1,671,518
COMBINED GAS HEATER AND COOK STOVE
Filed May 13, 1927
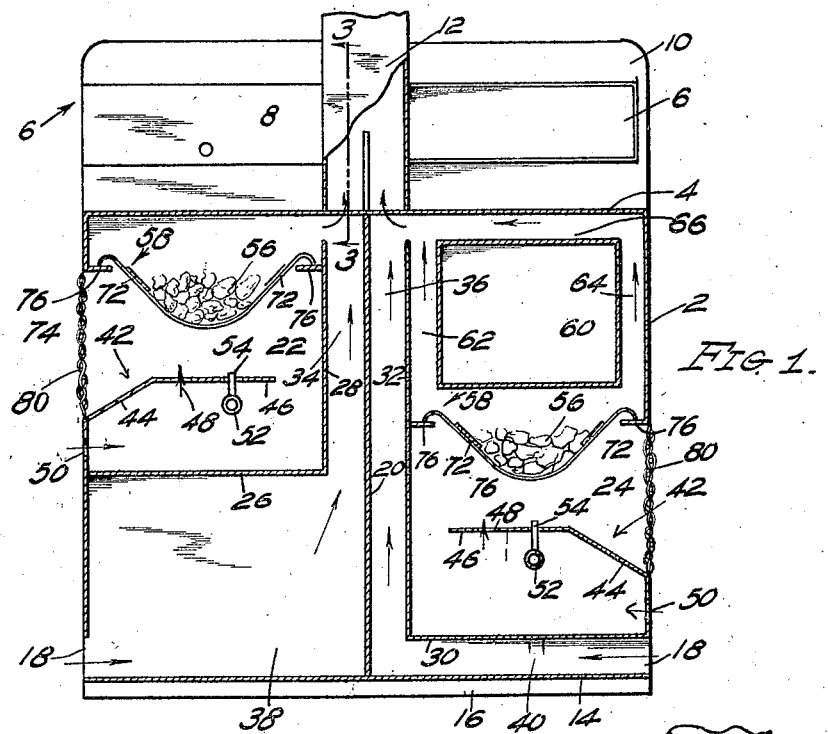
INVENTOR.
C. E. C. EDEY
BY Fred H Hayn
ATTORNEY Patented May 29, 1928.

1,671,518

UNITED STATES PATENT OFFICE.

CHARLES E. C. EDEY, OF LOS ANGELES, CALIFORNIA.

COMBINED GAS HEATER AND COOK STOVE.

Application filed May 13, 1927. Serial No. 191,045.

My invention relates to gas heaters of the convection type whereby a room or building may be heated by convection rather than by heat radiation, said invention relating more particularly to a combined gas heater and cook stove, means being provided whereby the formation of noxious gases in said heater may effectively be prevented.

It, accordingly is an object of my invention to provide a novel form of combined gas heater and cook stove in which a casing equipped with a set of horizontal and vertical convection flues, connected at the bottom of said heater with air inlet passages, said heater being also provided with one or more ovens and a set of fire brick holding grate bars, which are adapted to be heated by gas burners positioned therebelow, an imperforate closure for said casing providing a means, heated by the heated fire brick, serving as a stove top for cooking, a set of warming ovens being also provided for keeping the cooked food warm.

It is also within the province of my invention to provide a novel form of heater with an inner casing coacting with an outer casing to provide a lower flue connected with an inlet passage in an outer casing whereby convection currents may be set up in said heater.

The above and further objects and advantages of my invention, as hereinafter will more fully appear, I attain by the apparatus constructed as described in the specification and illustrated in the drawings accompanying the same and forming a part of my application.

Reference is had to the accompanying drawings, in which similar reference characters denote similar parts. In the drawings, Fig. 1 is a part sectional and part elevational view of one form of my invention.

Fig. 2 is a perspective view of the fire brick holding grate.

Fig. 3 is a fragmentary cross-sectional view taken on the line 3—3, Fig. 1, and looking in the direction of the arrows, and Fig. 4 is an alternative or modified form of my invention.

Describing my invention more in detail, it is my purpose to provide a novel form of combined gas heater and cook stove adapted to heat a room or building, and at the same time be used as a cook stove, means being provided for the elimination of the noxious gases usually formed in gas heaters, especially where there is, as is invariably the case, a fluctuation of gas pressure.

In the form of invention depicted in Figs. 1-3, I provide a casing 2, enclosed at the front and rear, and equipped with an imperforate top 4, which top serves as a heated portion upon which the food is cooked, a pair of warming ovens 6, each provided with a suitable closure 8 of any preferred form, to afford a convenient means for keeping the cooked food warm, said warming ovens being positioned on the back 10 and connected thereto in any preferred way, a stack 12, if desired, being positioned between said ovens, which stack may lead to a chimney, although this is by no means necessary.

The casing 2 is provided with a bottom 14, which may be equipped with a portion 16 for positioning the casing above the floor but this is by no means necessary, since the bottom 14 is always quite cool, the cool air being admitted to the apparatus by the openings 18, which openings may extend entirely across the sides of the casing 2. It is this entering cool air, indicated by the arrows, that, in connection with the heated air, presently to be more particularly referred to, sets up the convection currents by which the room or building is heated. This is a very valuable feature of my invention, for there is no heating by radiation, the casing 2, with the exception of the top 4, upon which the cooking is done, being at all times quite cool.

The casing 2 is equipped with a central partition 20, which partition extends the entire length of the casing below the top 4, and, if desired, may be extended upwardly into the stack as shown in Fig. 1.

As shown in Fig. 1, two compartments 22 and 24 are provided, defined by the walls 26, 28, 30 and 32, and the walls of the casing 2, the vertical walls 28 and 32 with the partition 20 defining a pair of vertical convection flues 34 and 36, connected respectively to the lower flues 38 and 40, to which the cool air is admitted by the passages or openings 18.

In the compartment 22 is positioned the burner, designated generally by the numeral 42, the compartment 24 being also equipped with such a burner. Said burner comprises an inclined wall 44 and a horizontal wall 46, said horizontal wall 46 being provided with combustion supporting air passages or openings 48, the walls of the casing 2 being provided with air openings 50 of any preferred number, and a pipe 52, equipped with gas jets 54, extended through the wall 46 provide the gas flame for heating the fire brick 56, positioned in the grate 58. Both compartments 22 and 24 are provided with this structure. This burner construction is of conventional form and hence need not be more particularly described.

As seen in Fig. 1, the burner 42 and grate 58 are positioned in the compartment 24 at a lower level than those in the compartment 22, so as to provide a space for the bake oven 60, which oven is equipped with side and top circulation flues 62, 64 and 66, so that said oven may be efficiently heated and at the same time assist in setting up convection currents in the apparatus. It will of course be understood that the compartment 22 may be provided with an oven if desired.

The grate 58 is preferably made separate from the apparatus so that it may be removed from time to time for cleaning purposes or for repair, and comprises front and back plates 68 and 70, connected by the horizontal elements 72 of any desired number, and with said elements are associated the curved cross pieces 74 having their end portions curved so as to form a supporting means for said grate on the ledges 76 associated with the casing 2 and the walls 28 and 32. A wire screen 78 of suitable mesh may be positioned on the grate 58 for preventing the fire brick 56 from falling through said grate. The openings at the side of the casing 2 leading to the burners and grate may also be provided with a wire screen 80.

As will be clear, the flame from the jets 54 heats the fire brick 56, ample air circulation being provided by the openings 50 and 48. This prevents the formation of noxious gases and also provides for heating efficiency, as will be understood. The heat from the fire brick heats the top 4 so that food may be cooked thereon. The oven 60 is also thus heated, and the heat communicated to the stack 12, as well as that rising from the heated top 4 heats the warming ovens 6. The arrows indicate the path of the heated and cool air currents, which, as explained, heat the room or building by convection and not radiation.

In Fig. 4 I have shown a slight modification in which the casing 2' is provided with bottom and back flues 38' and 36', leading to the stack 12, the fire brick 56' on the grate 58', similar to the other form of my invention supplying the heat when heated by the burner 52' equipped with the jets 54'. Both forms of my invention may be provided with a gas regulating cock c' of conventional construction.

While I have thus described my invention with great particularity, it will be clear that the same may be modified throughout a wide range. I accordingly do not propose to be limited to the exact details of construction shown and described but reserve the right in practice to make any and all modifications thereof that fall within the scope of the appended claims.

I claim as my invention:

1. A heater comprising a casing, a central vertical dividing partition therein, walls spaced from each side of said partition to form flues and defining combustion chambers, said flues opening through the casing below said chambers, an oven directly above one chamber, and a cooking top above the other chamber and the oven.

2. A heater comprising a casing, a central vertical dividing partition therein, walls spaced from each side of said partition to form flues and defining combustion chambers, said flues opening through the casing below said chambers, an oven directly above one chamber, a cooking top above the other chamber and the oven, and fire holding grates in said chambers.

3. A heater comprising a casing, a central vertical dividing partition therein, walls spaced from each side of said partition to form flues and defining combustion chambers, said flues opening through the casing below said chambers, an oven directly above one chamber, a cooking top above the other chamber and the oven, and gas burners in said chambers.

4. A heater comprising a casing, a central vertical dividing partition therein, walls spaced from each side of said partition to form flues and defining combustion chambers, said flues opening through the casing below said chambers, an oven directly above one chamber, a cooking top above the other chamber and the oven, said flues being open to the atmosphere, and warming ovens above the cooking top.

In testimony whereof I have signed my name to this specification.

CHARLES E. C. EDEY.